United States Patent [19]

Kuzunuki et al.

[11] 4,448,286
[45] May 15, 1984

[54] ELEVATOR GROUP CONTROL SYSTEM

[75] Inventors: Soshiro Kuzunuki, Katsuta; Kotaro Hirasawa, Hitachi, both of Japan

[73] Assignee: Hitachi, Ltd., Tokyo, Japan

[21] Appl. No.: 397,046

[22] Filed: Jul. 12, 1982

[30] Foreign Application Priority Data

Jul. 15, 1981 [JP] Japan .................................. 56-109216

[51] Int. Cl.³ .............................................. B66B 1/18
[52] U.S. Cl. .................................................. 187/29 R
[58] Field of Search ........................................... 187/29

[56] References Cited

U.S. PATENT DOCUMENTS

| 4,244,450 | 1/1981 | Umeda et al. | 187/29 |
| 4,355,705 | 10/1982 | Schröder et al. | 187/29 |
| 4,363,381 | 12/1982 | Bittar | 187/29 |
| 4,402,387 | 9/1983 | Tsuji et al. | 187/29 |

Primary Examiner—G. Z. Rubinson
Assistant Examiner—W. E. Duncanson, Jr.
Attorney, Agent, or Firm—Antonelli, Terry & Wands

[57] ABSTRACT

An elevator group control system in which, in response to origination of a new hall call, a floor-stop call evaluation factor indicative of the degree of saving of power consumption is computed besides a serviceability evaluation factor indicative of the passenger serviceability, for example, the waiting time. One of these evaluation factors is weighted relative to the other to compute an allocation evaluation factor indicative of the suitability of allocation of the new hall call to one of the elevator cars, and the new hall call is allotted to the elevator car which is decided to be most suitable for the service in respect of the value of the allocation evaluation factor.

11 Claims, 12 Drawing Figures

ELEVATOR GROUP CONTROL SYSTEM

This invention relates to a control system for controlling a group of elevator cars, and more particularly to such a control system which controls the elevator car group depending on whether improved service to passengers (for example, shortening of waiting time) is important or saving of power consumption is important.

A microcomputer is now widely used or incorporated in an elevator group control system for the efficient group control of a plurality of elevator cars. The use of the microcomputer has made possible to monitor in real time the serviceability of the individual elevator cars to hall calls originated from individual floors of a building, thereby achieving the desired group control of the elevator cars in which the serviceability of the elevator cars to all of the hall calls originated from all of the floors of the building is taken into account. For example, an elevator group control system based on the so-called call allocation method contributing greatly to improved performance has been realized in which, in order to select an elevator car most suitable for responding to a newly originated hall call and to allot such a hall call to the selected elevator car, an evaluation function taking into account the service-ability of plural elevator cars to all the floors of a building is computed, so as to allot the originated new hall call to an elevator car which is decided that the value of the evaluation function is minimum (or maximum).

As the evaluation factor of the evaluation function, the forecast waiting time has been most frequently employed hitherto to achieve the desired improved service to the passengers. This evaluation factor is provided in various forms as described presently:

(1) In one of methods, this evaluation factor is provided by the forecast waiting time required for one of the elevator cars to arrive at the new hall call originated floor.

(2) In another method, the evaluation factor is provided by the maximum one of the values of the forecast waiting time for the passengers who stand at the floors located forward of the new hall call originated floor after having originated hall calls allotted already to the elevator cars.

(3) In still another method, the evaluation factor is provided by the sum of the squares of the values of the forecast waiting time for the passengers who stand at the floors located forward of the new hall originated floor after having originated hall calls allotted already to the elevator cars.

However, all of these evaluation functions or factors have primarily aimed to improve the service to the passengers, that is, to shorten the waiting time, as described in, for example, U.S. Pat. No. 4,081,059. At the present time in which the energy cris is prevails, the method of control aiming only to provide the improved service is not necessarily best of all. In other words, an elevator group control system which can also save energy as much as possible has been strongly demanded.

For the purpose of attainment of energy saving, a number-of-cars control method has been proposed and put into practical use, in which the number of operating elevator cars is controlled depending on, for example, the traffic demand. This number-of-cars control method has been advantageous in that, among others, the group control can be realized by a simple algorithm. On the other hand, this number-of-cars control method has been disadvantageous in that the power consumption cannot always be continuously controlled, that is, saving of energy in a quantity corresponding to shutdown and exclusion of, for example, 1.5 elevator cars from the passenger service cannot always be attained. The proposed control method has also been disadvantageous in that the proper rotation of the shutdown command for averaging the number of shutdown elevator cars is relatively difficult. The proposed control method has further been disadvantageous in that, even when a new hall call can be allotted to the most suitable elevator car, it is difficult to drive it while satisfying both of the serviceability requirement and the power consumption saving requirement, because the call allocation evaluation function includes only the serviceability evaluation factor.

It is therefore a primary object of the present invention to provide an elevator group control system which controls a group of elevator cars while ensuring optimized matching between the requirement for improved passenger service and the requirement for saving of power consumption.

The elevator group control system according to the present invention which attains the above object is featured by the fact that a floor-stop call evaluation factor imdicative of the degree of saving of power consumption is computed besides the serviceability evaluation factor indicative of the serviceability to the passengers, and one of these evaluation factors is weighted relative to the other to compute an allocation evaluation factor indicative of the suitability of allocation of a new hall call to one of elevator cars, the relative weight being made variable depending on, for example, the traffic demand.

Thus, when the floor-stop call evaluation factor is weighted relative to the serviceability evaluation factor to be predominant over the latter, a newly originated hall call can be allotted to an elevator car to which many floor-stop calls have already been allotted thereby concentrating the load on such a specific elevator car, so that the number of car starting can be decreased to attain the desired effect of energy saving. When, on the other hand, the serviceability evaluation factor is weighted relative to the floor-stop call evaluation factor to be predominant over the latter, the elevator car group is so controlled as to provide improved service to the passengers rather than to achieve the effect of energy saving.

The above and other objects, features and advantages of the present invention will be apparent from the following detailed description of the preferred embodiments of the invention in conjunction with the accompanying drawings, in which:

Figure 1:
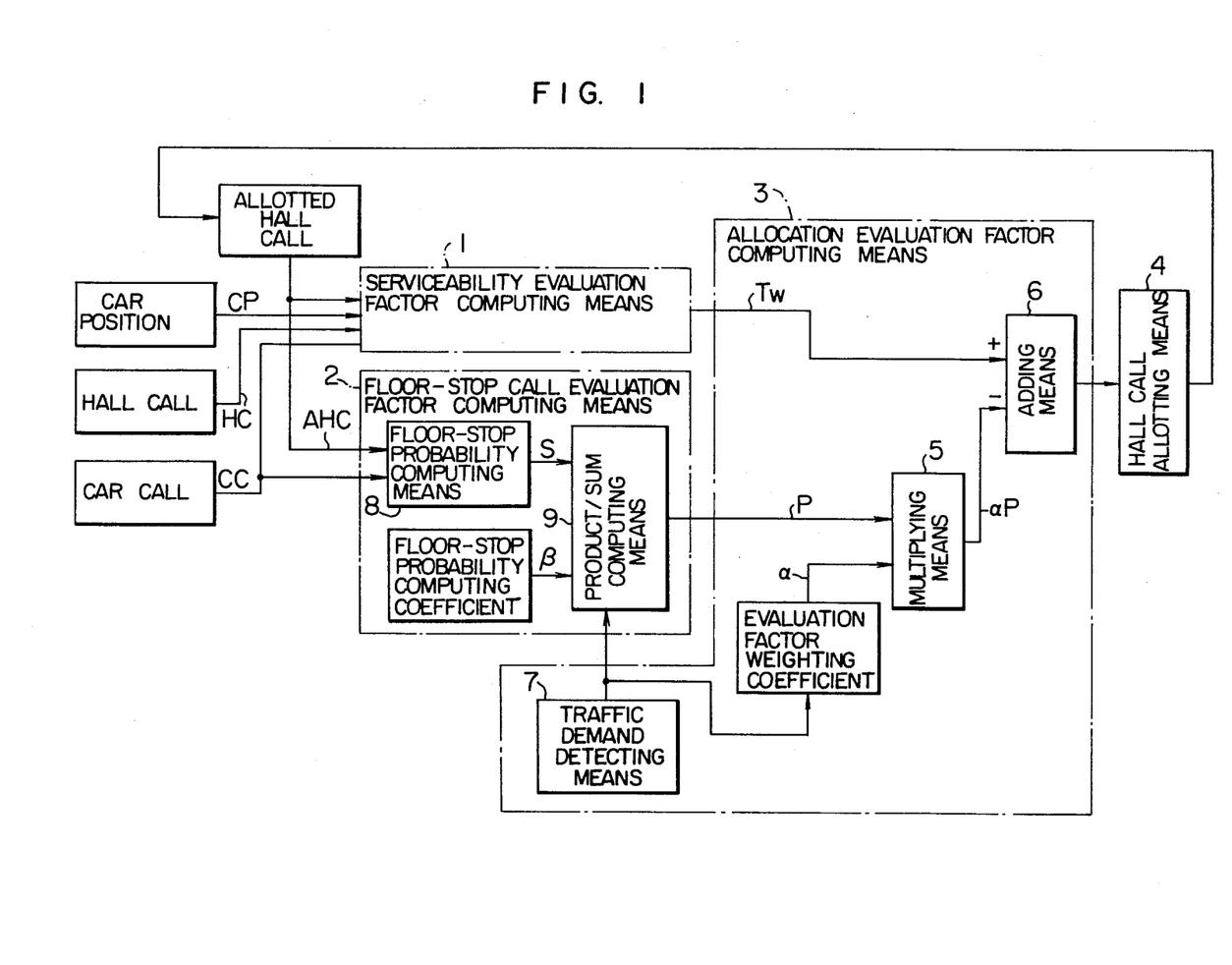
FIG. 1 is a block circuit diagram showing the structure of a preferred embodiment of the elevator group control system according to the present invention.

Referring now to FIG. 1 showing a preferred embodiment of the elevator group control system according to the present invention, the control system comprises serviceability evaluation factor computing means 1 for computing the serviceability evaluation factor principally indicative of the forecast waiting time in response to the application of car position data CP, hall call data HC and car call data CC; floor-stop call evaluation factor computing means 2 for computing the floor-stop call evaluation factor in response to the application of allotted hall call data AHC and car call data CC; allocation evaluation factor computing means 3 for computing the allocation evaluation factor for the purpose of hall call allocation in response to the application of the signals indicative of the serviceability evaluation factor and floor-stop call evaluation factor; and hall call allocation means 4 for allotting a newly originated hall call to an elevator car which is decided that the value of the allocation evaluation factor is optimum.

The computation of the allocation evaluation factor for the purpose of hall call allocation is carried out by the combination of multiplying means 5 and adding means 6 in the allocation evaluation factor computing means 3 shown in FIG. 1, as follows:

$$\phi = Tw - \alpha P \qquad (1)$$

where
  $\phi$:allocation evaluation factor
  $Tw$:serviceability evaluation factor
  $P$:floor-stop call evaluation factor
  $\alpha$:weight coefficient for P The value of the allocation evaluation factor $\phi$ given by the equation (1) is computed for each individual elevator car according to the equation (1) to allot the newly originated hall call to one of the elevator cars according to the following expression:

$$\text{Min}\{\phi_1, \phi_2, \ldots, \phi_l\} \qquad (2)$$

where l represents the number of elevator cars. That is, the newly originated hall call is allotted to the elevator car which is decided that the value of the allocation evaluation factor $\phi$ is minimum among those of the l elevator cars.

Figure 2:
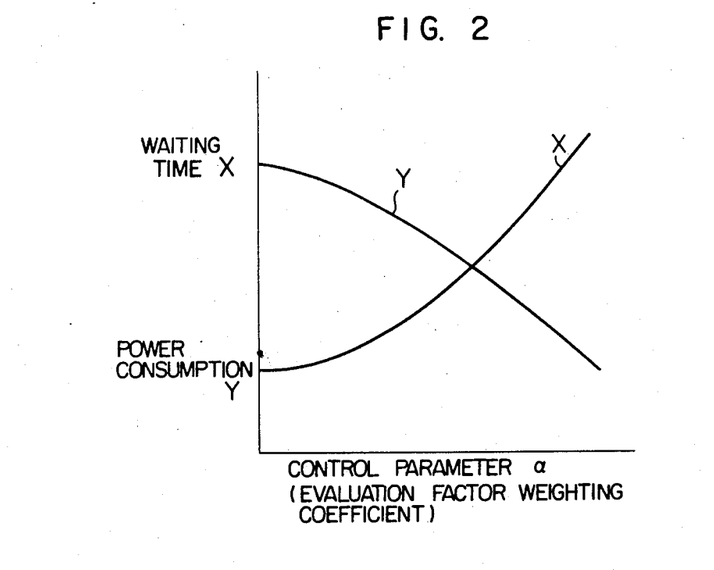
FIG. 2 is a graph showing the waiting time X and power consumption Y variable relative to the control parameter $a$.

When the evaluation factor weighting coefficient α in the equation (1) is selected to be zero, it is apparent that the serviceability becomes especially a matter of importance as in the prior art case. Also, the larger the value of α in the equation (1), the proportion of the floor-stop call evaluation factor P becomes greater, and the serviceability is reduced to the contrary. These relations are shown in FIG. 2. The horizontal axis in FIG. 2 represents the control parameter (for example, the evaluation factor weighting coefficient) α, and the vertical axis represents both of the waiting time X representative of the service-ability and the power consumption Y having a proportional relation to the floor-stop call evaluation factor P. Thus, the larger the value of the control parameter α, the proportion of the floor-stop call evaluation factor P becomes greater. This means that the load is concentrated on a specific elevator car (that is, the number of call-responding elevator cars is decreased), and the power consumption Y is reduced. On the other hand, the larger the value of the control parameter α, the waiting time X for the passengers becomes longer thereby degrading the serviceability.

As discussed hereinbefore, the serviceability and the saving of energy are contradictory to each other, and it is necesssary to consider a balance therebetween in the actual operation of the control system controlling the elevator car group.

Referring to FIG. 1 again, the allocation evaluation factor computing means 3 includes traffic demand detecting means 7 whose detection output signal D is used for flexibly varying the value of the evaluation factor weighting coefficient α, so that efficient saving of energy can be more reliably attained. For example, in a non-busy time zone or in a usual operating condition of the elevator system in which the traffic demand is not heavy and the waiting time is short, the value of the weight coefficient α is selected to be relatively large so as to enhance the effect of energy saving, while somewhat sacrificing or increasing the waiting time resulting in reduced service. On the other hand, in a busy time zone or in a rush-hour zone (for example, at the lunch time) in which the traffic demand is heavy and the waiting time is long, the value of the weight coefficient α is selected to be small so as not to degrade the serviceability although the power consumption increases somewhat. In this manner, an efficient control mode can be taken depending on the traffic demand. This traffic demand detecting means 7 may be means for detecting the volume of traffic such as the number of passengers. In another form, this traffic demand detecting means may be a clock when it can be forecast that the volume of traffic changes at a fixed rate in specific time zones of a day. In still another form, this traffic demand detecting means 7 may be externally controllable setting means such as a variable resistor or a change-over switch used for manually varying the voltage level.

It is an important feature of the present invention that, by utilization of the evaluation factor weighting coefficient α in the equation (1) as the control parameter, a continuous power consumption control for the purpose of energy saving can be done as seen in FIG. 2, and this manner of power consumption control is distinguished from the prior art method of controlling the number of operating elevator cars. Thus, the present invention is greatly advantageous over the prior art.

The practical manner of computation of the allocation evaluation factor $\phi$ will now be described. The structure of the serviceability evaluation factor computing means 1 computing the serviceability evaluation factor Tw is already known from, for example, U.S. Pat. No. 4,081,059, especially, FIG. 7 thereof, and any detailed description of such means is therefore unnecessary. The structure of the floor-stop call evaluation factor computing means 2 computing the floor-stop call evaluation factor P will be described presently.

Referring to FIG. 1 again, the floor-stop call evaluation factor computing means 2 includes floor-stop probability computing means 8 and product/sum computing means 9. The floor-stop probability computing means 8 computes the floor-stop probability S in response to the application of allotted hall call data AHC and car call data cc. The product/sum computing means 9 multiplies the computed floor-stop probability S by a floor-stop probability weighting coefficient $\beta$ to compute the product $\beta S$ for each of a plurality of floors within a predetermined floor range, and then sums the products over the predetermined floor range to compute the floor-stop call evaluation factor P. The output signal indicative of the computed floor-stop call evaluation factor P is applied to the multiplying means 5.

In the present embodiment, the value of the floor-stop probability S is set at 1.0 when there is a service-requesting call such as an allotted hall call AHC or a car call CC, and set at 0.0 when such a call is not present.

Figure 3A:
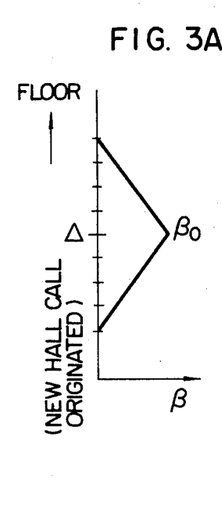
FIGS. 3A, 3B and 3C are graphs showing how the weight coefficient used for weighting the floor-stop probability is distributed to a plurality of floors of a building.
Figure 3B:
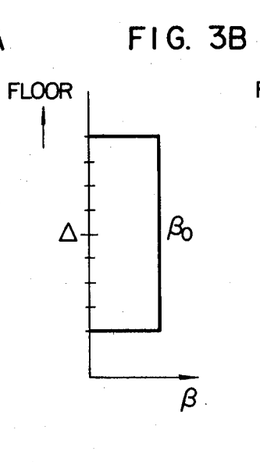
Figure 3C:
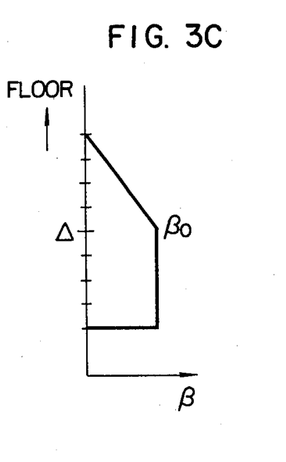

The function of the floor-stop probability weighting coefficient $\beta$ used for the computation of the floor-stop call evaluation factor S may have various forms as shown in FIGS. 3A, 3B and 3C. For example, FIG. 3A shows a triangular weight function in which the value of the weight is largest at a new hall call originated floor and becomes progressively smaller toward upper and lower floors with the increase in the distance from the new hall call originated floor. FIG. 3B shows a rectangular weight function in which the value of the weight is constant within a predetermined floor range. FIG. 3C shows a trapezoidal weight function which is the combination of the functions shown in FIGS. 3A and 3B.

Figure 4A:
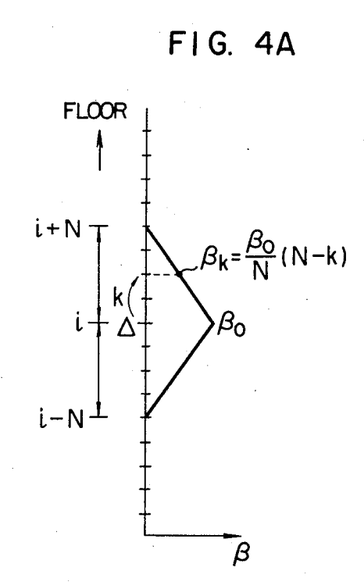
FIGS. 4A and 4B are graphs showing how the weight coefficient used for weighting the floor-stop probability is computed when the distribution is as shown in FIG. 3A.

Suppose now that the weight function shown in FIG. 3A is employed, and $\beta_o$ is the floor-stop probability weighting coefficient at an i-th floor from which a new hall call is originated as shown in FIG. 4A. Then, when 2N is the number of floors in the predetermined floor range, the floor-stop probability weighting coefficient $\beta_k$ at a floor spaced apart by k floors from the i-th floor in the up or down direction is given by $$\beta_k = \frac{\beta_o}{N} (N \mp k)_{k=\pm 1, \pm 2, \ldots, \pm N} \quad (3)$$

Similarly, in the case of FIG. 3B, $\beta_k$ is given by $$\beta_k = \beta_{ok = \pm 1, \pm 2, \ldots, \pm N} \quad (4)$$

and is constant or equal to the value of $\beta_o$. On the other hand, in the case of FIG. 3C, $\beta_k$ is given by $$\begin{cases} \beta_k = \frac{\beta_o}{N} (N - k)_{k=+1, +2, \ldots, +N} \cdots (5) \\ \beta_k = \beta_{ok = -1, -2, \ldots, -N} \cdots (6) \end{cases}$$

Figure 5:
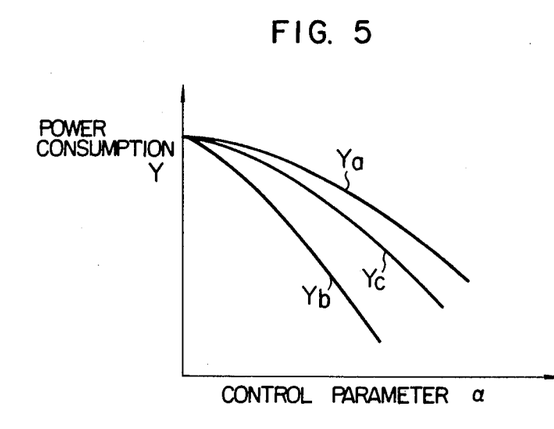
FIGS. 5 and 6 are graphs showing the relation between the power consumption Y and the control parameter α and the relation between the waiting time X and the control parameter α respectively in the cases of the distributions shown in FIGS. 3A, 3B and 3C.
Figure 6:
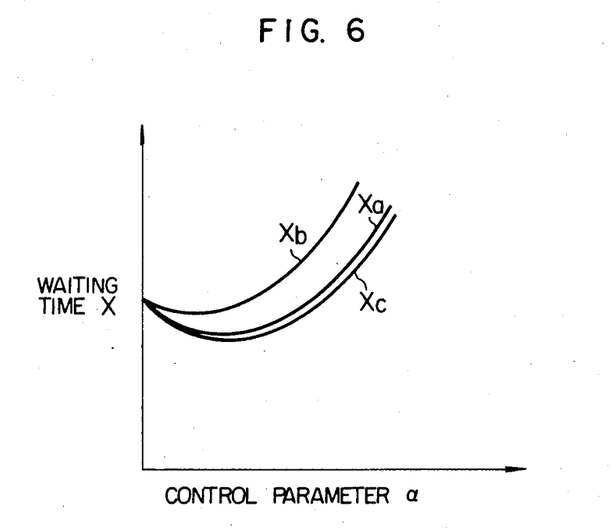

Although a waiting time curve and a power consumption curve as shown in FIG. 2 can be obtained with any one of the weight functions shown in FIGS. 3A, 3B and 3C, the shape of these curves differs depending on the weight function. Suppose that the value of the floor-stop probability weighting coefficient $\beta_o$ at the i-th floor from which the new hall call is originated, is the same for all of the cases shown in FIGS. 3A to 3C. Then, the larger the area of the weight functions shown in FIGS. 3A to 3C, the larger is the value of the floor-stop call evaluation factor P. The power consumption Y relative to the control parameter (which is, for example, the evaluation factor weighting coefficient $\alpha$) is shown by curves Ya, Yb and Yc in FIG. 5 when the weight function has the forms shown in FIGS. 3A, 3B and 3C respectively. It will be seen in FIG. 5 that the downward gradient of these curves Ya, Yb and Yc increases in the order of Ya, Yc and Yb. When, on the other hand, the value of the floor-stop probability weighting coefficient $\beta_o$ is so selected as to provide the same area of the weight function in each of the cases shown in FIGS. 3A to 3C, the power consumption curves Ya, Yb and Yc shown in FIG. 5 have substantially the same gradient. However, as shown in FIG. 6, the waiting time X increases relative to the control parameter $\alpha$ in the order of a curve Xc corresponding to FIG. 3C, a curve Xa corresponding to FIG. 3A and a curve Xb corresponding to FIG. 3B. It will be seen in FIG. 6 that the weighting time X represented by the curve Xb corresponding to FIG. 3B is especially very large compared with those represented by the curves Xa and Xc corresponding to FIGS. 3A and 3C respectively. It can be seen from the above discussion that the weight function shown in FIG. 3A or 3C is preferably employed in order to achieve the effect of energy saving without degrading the serviceability such as the waiting time as much as possible.

Those skilled in the art will readily understand that a waiting time curve and a power consumption curve as shown in FIG. 2 can also be provided by employment of a new weight function obtained by a suitable combination of the weight functions shown in FIGS. 3A to 3C.

Figure 4B:
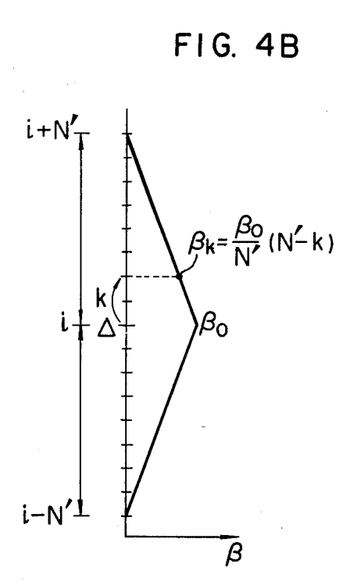

The predetermined floor range 2N shown in FIG. 4A may be widened to 2N' (N' > N) as shown in FIG. 4B by applying a corresponding output signal D to the product/sum computing means 9 from the traffic demand detecting means 7 shown in FIG. 1. The floor-stop probability weighting coefficient $\beta_k$ in such a case is given by $$\beta_k = \frac{\beta_o}{N'} (N' - k)_{k=\pm 1, \pm 2, \ldots \pm N'} \quad (7)$$

When the predetermined floor range 2N is increased to 2N' as shown in FIG. 4B, the floor range in which floor-stop calls must be taken into account is widened correspondingly, and the second term in the equation (1) becomes more effective in the effort to contribute to the saving of energy. Therefore, an efficient group control can be effected by widening the predetermined floor range when the traffic demand is light and narrowing the predetermined floor range when the traffic demand is heavy. Thus, the value of the predetermined floor range provides another control parameter besides the evaluation factor weighting coefficient $\alpha$ shown in FIG. 2.

As described hereinbefore, the floor-stop probability S is set at 1.0 when a service-requesting call is present and at 0.0 when such a call is not present. Therefore, in a numerical expression, the floor-stop probability $S_k$ at a floor spaced apart by k floors in the up or down direction from an i-th floor from which a new hall call is originated, is expressed as $$S_k = \begin{cases} 1.0 \text{ (in the presence of a service-requesting} \\ \quad \text{call at the } (i \pm k)\text{th floor)} \\ 0.0 \text{ (in the absence of such a call at such} \\ \quad \text{a floor)} \end{cases} \quad (8)$$

Therefore, the floor-stop call evaluation factor P, which is the function of the floor-stop probability $S_k$, the weight coefficient $\beta_k$ for the floor-stop probability $S_k$ and the predetermined floor range 2N, can be computed as $$P = \sum_{k=1}^{\pm N} \beta_k \cdot S_k \quad (9)$$

An outline of the elevator group control system embodying one aspect of the present invention has been described with reference to FIGS. 1 to 6. A more detailed form of the present invention will now be described.

Figure 7:
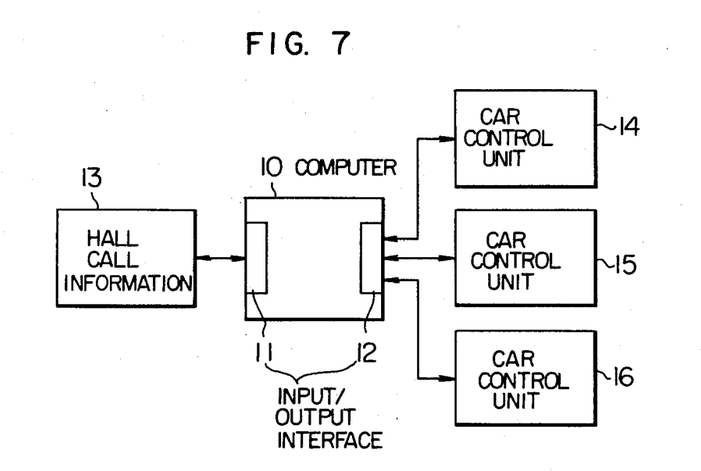
FIG. 7 is a block diagram showing the arrangement of the elevator group control system shown in FIG. 1.

FIG. 7 is a block diagram showing the arrangement of the elevator group control system which employs a digital computer such as a microcomputer.

Referring to FIG. 7, a digital computer 10 is connected through an input/output interface 11 to a hall call information source 13 and connected through another input/output interface 12 to a plurality of elevator car control units 14, 15 and 16. (In FIG. 7, three control units are shown for controlling three elevator cars A, B and C respectively, by way of example.) Hall call information is applied from the source 13 to the digital computer 10 through the input/output interface 11. Can call information and elevator car status information including car direction information, car position information and car door open-close information are applied from the three elevator car control units 14 to 16 to the digital computer 10 through the input/output interface 12. When now a new hall call is originated from a floor, the in-service elevator car most suitable for responding to that hall call is selected according to a program stored in the digital computer 10 which makes necessary computation on the basis of the applied information, and the hall call is allotted to the selected most suitable elevator car. The output signal indicative of the allotted hall call is applied through the input/output interface 12 to the selected one of the elevator car control units 14 to 16.

By virtue of the hardware arrangement of the elevator group control system shown in FIG. 7, all the necessary computation can be executed according to the program or software stored in the digital computer 10. The software (the program) for executing the functions of the computing means shown by the blocks in FIG. 1 will now be described in detail.

Figure 8:
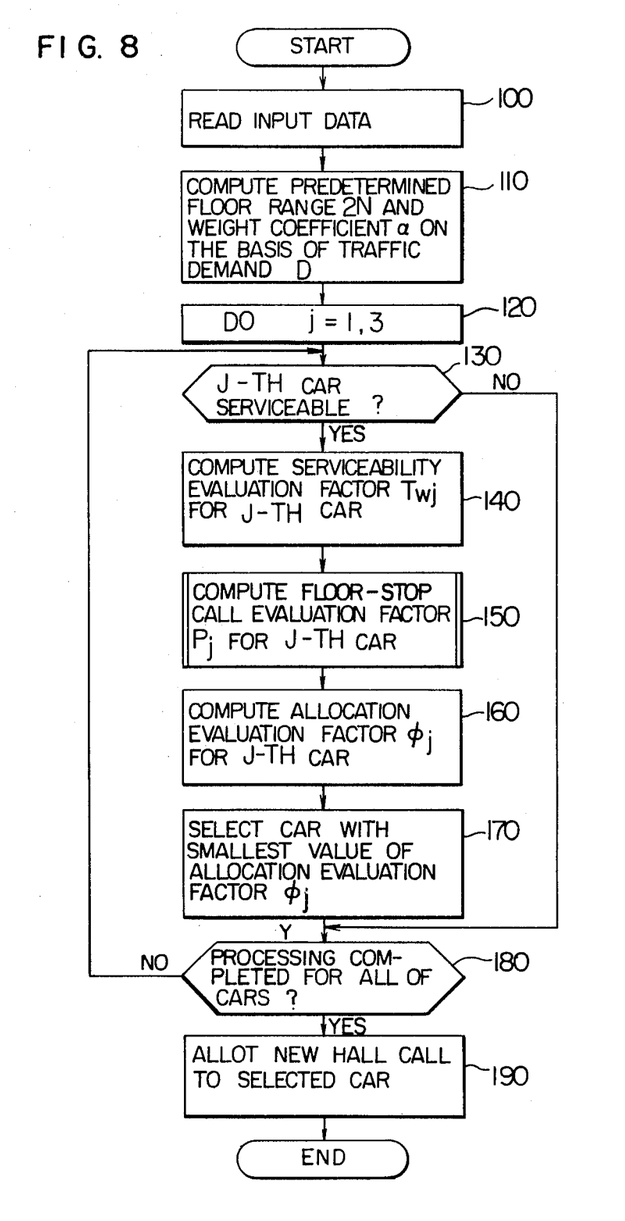
Fig. 8 is a flow chart illustrating the operation of the elevator group control system shown in FIG. 1.

FIG. 8 is a flow chart of the program used for executing the functions of the blocks shown in FIG. 1.

In response to the origination of a new hall call, the sequence of the flow chart shown in FIG. 8 is started. In step 100, input data required for the allocation of the new hall call to the most suitable one of the elevator cars are read. The input data include position data of the elevator cars, car call data, hall call data and traffic demand data. (Data including hall call data, car call data and number-of-passengers data may also be used for the computation.) In step 110, the initial data, that is, the predetermined floor range 2N and the evaluation factor weighting coefficient $\alpha$, required for the computation of the evaluation factor P are computed on the basis of the output signal D from the traffic demand detecting means 7. This computation can be simply done by previously preparing a plurality of tables including various values of the predetermined floor range 2N and evaluation factor weight coefficient $\alpha$ corresponding to various values of the traffic demand D respectively and reading out the contents of a selected one of the tables. In the tables so prepared, the floor range 2N may be relatively roughly set stepwise, while, on the other hand, the coefficient $\alpha$ may be relatively closely set.

In steps 120 and 180 of the flow chart, the expressions "DO j=1, 3" and "CONTINUE" are used to indicate that the flow therebetween is repeated three times by processing with index registers j, where j represents the car number. Such expressions are also used in the later part of the flow chart to indicate the same meaning. Thus, the notation is such that similar processing is repeated for all of the elevator cars Nos. 1 to 3.

In initial step 130 of the loop-like operation, whether a j-th elevator car is serviceable or not is checked, and, when the result of checking proves that the j-th elevator car is not serviceable, the program jumps to step 180 in which the serviceability of another elevator car is checked. The elevator car is decided to be non-serviceable when it is disabled due to trouble or the cage is being cleaned or no vacancy for passenger. When, on the other hand, the result of checking in step 130 proves that the j-th elevator car is serviceable, the processing shifts to step 140. The purpose of elevator car serviceability checking in step 130 is to check as to whether the specific elevator car has already been excluded from the group control as when, for example, it has been disabled due to trouble, and to check as to whether the specific elevator car is full loaded or likely to be full loaded before responding the new hall call. Since the present invention is specifically featured by the fact that a new hall call is allotted to an elevator car having many service-requesting calls allotted already thereto, it is important to forecast as to whether such an elevator car is full loaded already or likely to be full loaded before responding the new hall call. Whether such an elevator car is full loaded or likely to be full loaded can be simply forecast by computation on the basis of the factors including allotted hall calls, car calls, the number of in-car passengers and the number of hall waiting passengers. The manner of forecasting above described is already known from, for example, the disclosure of U.S. Pat No. 4,081,059, and any detailed description will therefore be unnecessary.

Then, in step 140, the serviceability evaluation factor Twj of the j-th elevator car is computed. Various methods of such computation are also disclosed and known already, and any detailed description will therefore be unnecessary.

In step 150, another evaluation factor or the floor-stop call evaluation factor Pj of the j-th elevator car is computed, and, in step 160, the allocation evaluation factor $\phi_j$ is computed by substituting the values of the two evaluation factors Twj and Pj, in the equation (1). A practical flow chart used for the computation of the floor-stop call evaluation factor Pj will be described later with reference to FIG. 9. This allocation evaluation factor $\phi_j$ is computed for each of the elevator cars by repeating the loop-like operation, and, in step 170, the elevator car, which is decided that the value of the allocation evaluation factor $\phi_j$ is smallest of all, is selected according to the equation (2).

By repeating the loop-like operation three times (since the number of elevator cars is assumed to be three herein), the most suitable elevator car is selected in step 170, and, in step 190, the new hall call originated is allotted to the selected elevator car to complete the processing according to the program.

Figure 9:
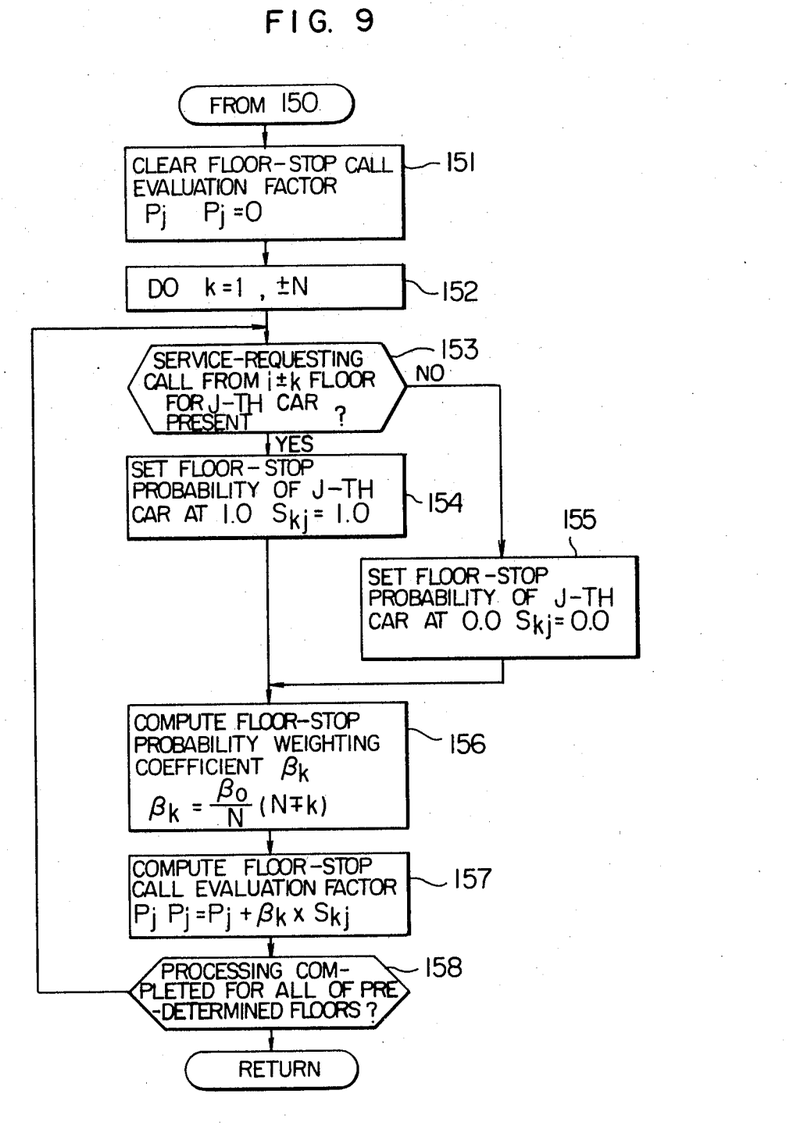
FIG. 9 is a flow chart illustrating in detail one of the subroutines shown in FIG. 8.

The detailed flow chart of the subroutine used for the computation of the floor-stop call evaluation factor $P_j$ in step 150 in FIG. 8 is shown in FIG. 9.

In the flow chart shown in FIG. 9, the triangular weight function shown in FIG. 3A is utilized as the floor-stop probability weighting coefficient $\beta$.

In step 151, the floor-stop call evaluation factor $P_j$ is cleared before carrying out the product/sum computation according to the equation (9), and the step 151 is followed by loop processing starting from step 152. The number of loop processing repeated for the product/sum computation of the floor-stop probability $S_{kj}$ and its weight coefficient $\beta_k$ is determined by the data of the predetermined floors 2N read in step 110 in FIG. 8. Then, in steps 153, 154 and 155, the floor-stop probability $S_{kj}$ is computed according to the equation (8), and, in step 156, the floor-stop probability weighting coefficient $\beta_k$ is computed according to the equation (3). This arithmetic operation may be replaced by such an operation in which the value of the floor-stop probability weighting coefficient $\beta_k$ is read out from a table of the results of weight coefficient computation stored previously in the read-only memory (ROM) in the digital computer 10.

Then, in step 157, the floor-stop probability $S_{kj}$ determined in step 154 or 155 is multiplied by the weight coefficient $\beta_k$ computed in step 156, and the previous value of the floor-stop call evaluation factor $P_j$ is added to the product to compute the new value of the floor-stop call evaluation factor $P_j$. By repeating such loop processing for each of the floors in the predetermined floor range, the final value of the floor-stop call evaluation factor $P_j$ is obtained in step 157.

Although the floor-stop probability weighting coefficient $\beta$ is fixed and the evaluation factor weighting coefficient $\alpha$ is made variable in the embodiment above described, the coefficient $\alpha$ may be fixed and the coefficient $\beta$ may be made variable, or both of these two coefficients $\alpha$ and $\beta$ may be made variable.

The embodiment of the present invention described above by way of example provides various advantages among others, as described presently.

It is a first advantage of the embodiment of the present invention that the process of energy saving can be continuously controlled as compared with the prior art system in which the process of energy saving is controlled stepwise by controlling the number of elevator cars under operation. It is a second advantage that the control parameters including the evaluation factor weighting coefficient and the predetermined floor range used for the computation of the floor-stop call evaluation factor are made variable to meet variations of the traffic demand, so that the elevator cars can be run for the save-energy operation in a time zone in which the traffic demand is relatively light, while the usual operation primarily aiming at the serviceability can be made in a time zone in which the traffic demand is heavy, thereby attaining the desired efficient group control of the elevator cars. It is a third advantage that the scheduled rotation of the elevator cars by shutdown of one or more of them according to the prior art number-of-cars control method need not be taken into consideration, and the individual elevator cars can be operated in a balanced relation. As a fourth advantage which is related to the first advantage, the quantity of energy to be saved can be set at the value corresponding to, for example, the one-half of that consumed by a single elevator car. When the quantity of energy to be saved is set at such a value, the passengers utilizing the elevator cars will not intuitively perceive the save-energy operation of the elevator system, and the desired save-energy operation can be easily introduced into the elevator system without provoking antipathy.

Although the two control parameters, that is, the evaluation factor weighting coefficient $\alpha$ and the predetermined floor range 2N are made variable to meet variations of the traffic demand in the afore-mentioned embodiment of the present invention, the effect is equivalent even when one of the control parameters is fixed and the other control parameter is made variable.

Further, although the control parameters are made variable depending on the traffic demand, a clock or like timing element controllable according to a time schedule may be used in lieu of the traffic demand detecting means. In another form, a potentiometer or a building control unit which is controllable from an external setting unit may be used to make variable the control parameters. These modifications exhibit also the advantages similar to those provided by the aforementioned embodiment of the present invention.

In the aforementioned embodiment of the present invention, the floor-stop call evaluation factor is computed on the basis of a predetermined floor range covering upper and lower floors contiguous to a floor from which a new hall call is originated. However, a ring service zone determined by the position and travelling direction of an elevator car may be selected as this predetermined floor range, or all the floors serviced by that elevator car may be selected as the predetermined floor range.

Further, although the floor-stop probability S is set at 1.0 in the presence of a service-requesting call and at 0.0 in the absence of such a call in the aforementioned embodiment of the present invention, the floor-stop probability S may be computed on the basis of forecast hall calls and car calls.

It will be understood from the foregoing detailed description of the present invention that the floor-stop call evaluation factor is computed besides the serviceability evaluation factor, one of these evaluation factors being then weighted relative to the other to compute the allocation evaluation factor, and the relative weight is made variable depending on, for example, the traffic demand. Therefore, the save-energy operation of the elevator system can be efficiently and smoothly done.

What is claimed is:

1. An elevator group control system comprising a plurality of elevator cars arranged for movement across a plurality of floors of a building, hall call registering means disposed at each of the floors to originate a hall call for calling one of said elevator cars toward said floor, car call registering means disposed in each of said elevator cars for instructing target floors, allocation evaluation factor computing means for computing for each of said elevator cars an allocation evaluation factor indicative of the suitability of allocation of a newly originated hall call to said elevator car, and hall call allotting means for allotting said new hall call to the elevator car which is decided to be most suitable for the service in respect of the value of the allocation evaluation factor, said allocation evaluation factor computing means including means for weighting the output signal from floor-stop probability evaluation factor computing means relatively to the output signal from serviceability evaluation factor computing means, and varying means for varying the traffic demand and varying the value of the relative weight depending on the detected traffic demand.

2. An elevator group control system according to claim 1, wherein said varying means is traffic demand detecting means for detecting the traffic demand.

3. An elevator group control system according to claim 1, wherein said floor-stop call evaluation factor computing means includes means for computing the floor-stop probability of each of said elevator cars, means for weighting the computed floor-stop probability, and means for summing the weighted floor-stop probability over a predetermined floor range.

4. An elevator group control system according to claim 3, wherein the relative weight provided by said weighting means and said predetermined floor range are varied depending on the output signal from said traffic demand detecting means.

5. An elevator group control system according to claim 2, wherein said traffic demand detecting means detects the volume of traffic or the number of passengers.

6. An elevator group control system according to claim 2, wherein said traffic demand detecting means is a clock.

7. An elevator group control system according to claim 2, wherein said traffic demand detecting means is an externally controllable setting unit such as a variable resistor or a change-over switch.

8. An elevator group control system according to claim 2, wherein the weight used for weighting said floor-stop probability is selected to be equal at all the floors within said predetermined floor range.

9. An elevator group control system according to claim 2, wherein the weight used for weighting said floor-stop probability is selected to progressively decrease with the increase in the distance from the floor from which the new hall call is originated.

10. An elevator group control system according to claim 2, wherein the weight used for weighting said floor-stop probability is selected to be equal at all the floors in the floor range backward of the floor from which the new hall call is originated, and selected to progressively decrease with the increase in the distance from the new hall call originated floor in the floor range forward of the new hall call originated floor.

11. An elevator group control system according to claim 1, wherein said serviceability evaluation factor computing means computes the forecast waiting time at the floor from which the new hall call is originated.

* * * * *